United States Patent

[11] 3,608,915

| [72] | Inventor | George Hohwart<br>Farmington, Mich. |
|---|---|---|
| [21] | Appl. No. | 829,203 |
| [22] | Filed | June 2, 1969 |
| [45] | Patented | Sept. 28, 1971 |
| [73] | Assignee | N. A. Woodworth Company<br>Ferndale, Mich. |

[54] FLOATING END STOP FOR WORK-HOLDING CHUCK
11 Claims, 5 Drawing Figs.

[52] U.S. Cl.................................................. 279/1 L,
82/40, 279/1 S
[51] Int. Cl...................................................... B23b 31/40
[50] Field of Search........................................... 279/1 S, 2,
16, 1 ME, 1 TE, 1 L, 1 J; 82/40

[56] References Cited
UNITED STATES PATENTS

| 2,732,213 | 1/1956 | Drew............................ | 279/1 S |
| 2,767,564 | 10/1956 | Green........................... | 279/16 X |
| 3,143,907 | 8/1964 | Ulrich........................... | 82/40 |

*Primary Examiner*—Andrew R. Juhasz
*Assistant Examiner*—James F. Coan
*Attorney*—Harness, Dickey & Pierce ABSTRACT: A work-holding chuck having a novel end stop comprising front and rear beveled washers, the front washer being mounted for universal rocking movement on a spherically curved annular seating surface of the rear washer to adapt to the seating end of the workpiece and the rear washer being freely laterally shiftable to accommodate rocking of the front washer.

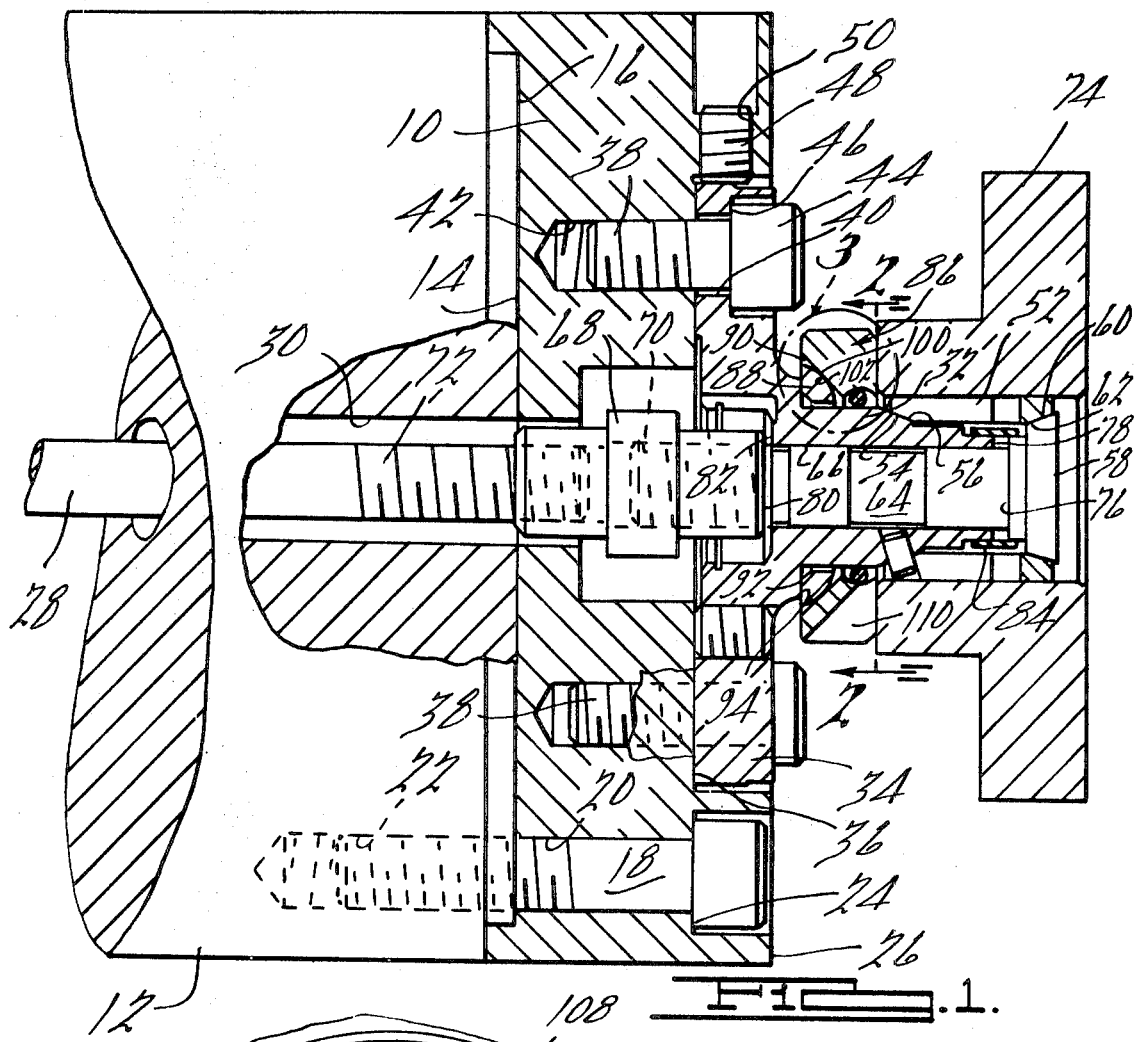

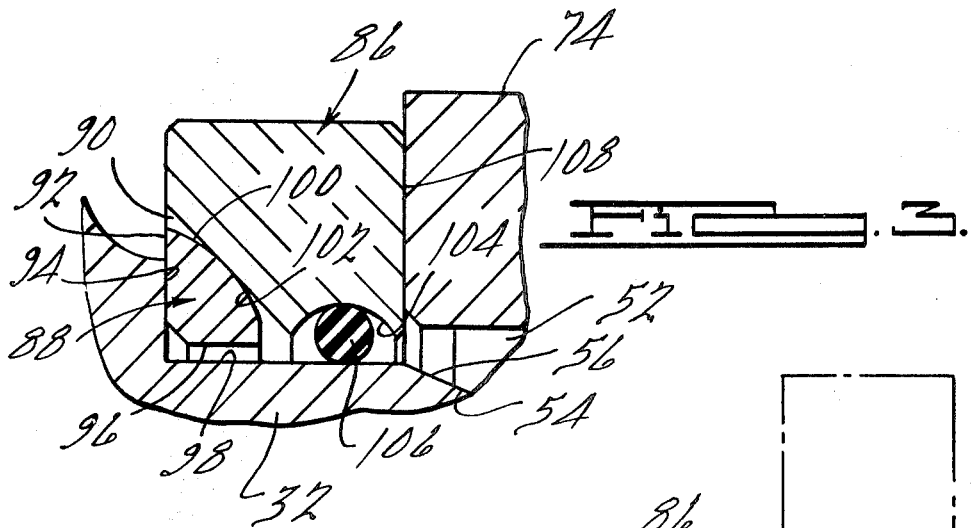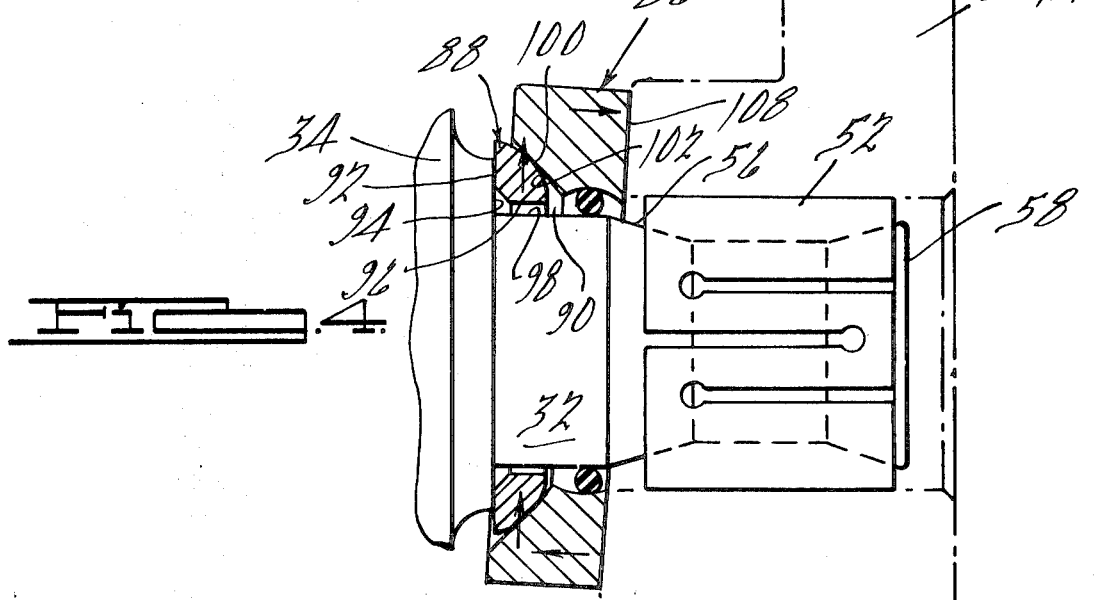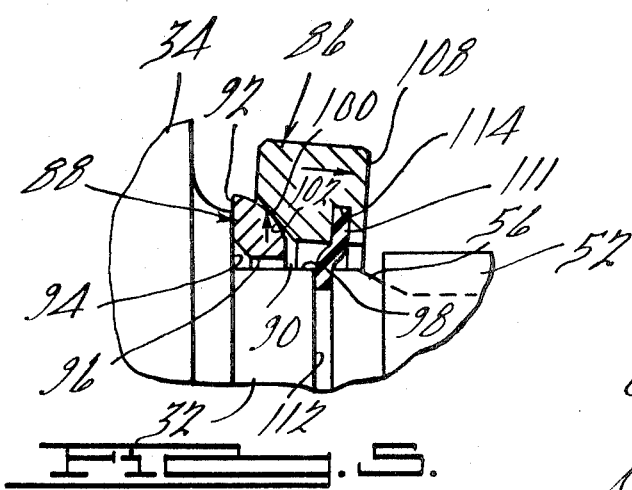

FLOATING END STOP FOR WORK-HOLDING CHUCK

BACKGROUND OF THE INVENTION

It is conventional to equip work-holding chucks with end stops on which the workpiece seats in the clamped position and which position the workpiece properly axially on the chuck. These workpieces usually are held with great force by the chuck while machining or other operations are performed thereon and it is desirable that the end stop contact the inner edge of the workpiece around its circumference so as to provide a proper support therefore. However, in many instances, the seating inner end of the workpiece is not precisely flat or exactly square with the axis of the workpiece and of the chuck. This is almost invariably true if the workpiece is a casting for example.

The usual practice is to provide the chuck with a fixed end stop; and it is apparent that a fixed stop may contact the workpiece at only one point on its circumference if the seating inner end of the workpiece is rough textured, as in the case of a casting; and it invariably contacts the workpiece at only one point if the seating end is out of square. The problem here is that many work-holding chucks tend to pull the workpiece back against the end stop as the work is clamped, and in these kinds of chucks the force with which the workpiece presses against the end stop increases greatly as full clamping pressure is applied. In the case of an arbor chuck, for example, this force may be sufficient to flex or warp the arbor itself, and this of course pulls the workpiece out of line and makes it impossible to finish a surface of the work to a close tolerance dimension with reference to the distorted bore or axis of the work.

Some attempts have been made to solve the problem by making the end stop tiltably or universally adjustable so that it adapts to the particular end face of the workpiece and engages and solidly supports the same around its circumference or at least at three points on its circumference. However, these end stops sometimes tend to jam or lock as full clamping pressure is imposed so that it cannot thereafter move to accommodate and adapt to the work. Furthermore, chucks of the type here under consideration normally are used in exceedingly dirty environments. Shavings and chips from the workpiece grinding dust and the like are constantly falling onto the chuck; and it frequently operates in a bath or flow of coolant which may cause solid particles to stick to the chuck and to wedge against and jam moving parts. Manifestly, an adjustable send stop in which the adjustable member is exposed is particularly vulnerable to this sort of thing.

SUMMARY OF THE INVENTION

The novel end stop of this invention is universally adjustable to seat solidly against the inner end of the workpiece under all conventional clamping pressures; and, the adjustable parts are such that clamping pressures and contaminants such as chips, dust and coolant will not significantly affect operation and adjustment of the stop. This result is accomplished by reason of the end stop being in the form of front and rear washerlike elements having opposed mutually engaged beveled or tapered surfaces at least one of which is spherically curved transversely thereof. The front element seats the workpiece and the rear element is supported on and is laterally shiftable relative to a radial surface or shoulder on the chuck. As a result of the particular shape and arrangement of these washerlike elements, the front element which is directly contacted by the workpiece is free to rock or tilt on the spherically beveled surface of the rear element so that it flatly engages the seating end of the workpiece ideally around its entire circumference; and the rear washerlike element is free to shift laterally as required to accommodate tilting movement of the front element. With respect to the rocking or tilting movement of the front element and the manner in which it engages the work, it will be readily apparent that the front element will not engage the work flatly entirely around its circumference in some instances as, for example, where a hole is to be broached through a casting in which the locating face has not been premachined. In such a case, the stop will likely support the workpiece at three spaced points only. However, the action of the stop and the movement of its parts is the same in every case. These movements of the parts occur freely under clamping pressure and the movements of the elements do not significantly affect or change the axial position of the workpiece on the chuck. Furthermore, the front washerlike element of the end stop is retained by an annular resilient member which may be in the form of a conventional O-ring or the like and which is interposed and compressed between the element and a fixed part of the chuck. This resilient member not only retains the front element and holds it properly positioned on the rear element but it also seals and closes the space between the stop and the chuck part with which it is associated and it also protects the seating surface of the rear element so that dirt and the like cannot readily lodge between or around the two stop elements and thus prevent the stop from performing its intended function.

DESCRIPTION OF THE DRAWINGS

FIG. 1 is a longitudinal sectional view through a collet chuck equipped with an end stop embodying the present invention;

FIG. 2 is an enlarged fragmentary, transverse sectional view taken on the line 2—2 of FIG. 1;

FIG. 3 is an enlarged view of the portion of FIG. 1 enclosed in the circle 3;

FIG. 4 is an enlarged view of the end stop showing the manner in which it adapts and adjusts to the inner out-of-square seating end of a workpiece; and FIG. 5 is a fragmentary view similar to FIG. 3 but showing a modified form of the invention.

DESCRIPTION OF THE PREFERRED EMBODIMENT

As suggested, the end stop of this invention can be applied to any conventional chuck which normally is equipped with an end stop. Typical examples of such chucks are the diaphragm chuck shown in the Hohwart et al. U.S. Pat. No. 2,450,800 dated Oct. 5, 1948 and the collet chuck shown in the Hohwart et al. U.S. Pat. No. 2,817,532 dated Dec. 24, 1957. A collet chuck of the latter type is shown here by way of example.

More specifically, the collet chuck illustrated in FIG. 1 comprises a generally disk-shaped backing plate 10 which is adapted for mounting on the face of a machine spindle 12. The particular backing plate 10 here shown has a central recess 14 in the rear surface thereof which fits over and snugly receives a central embossment 16 on the end of the spindle 12 to hold the backing plate properly centered on the spindle. An annular series of screws 18 extend through clearance holes 20 in the backing plate 10 and into threaded holes 22 provided in the spindle, and the heads of the screws preferably are accommodated in counter sinks 24 at the outer ends of the clearance holes 20 so that the screwheads are flush, or approximately so, with the front face 26 of the plate.

It will be readily appreciated that the spindle 12 conventionally is supported for rotation either in a horizontal position or in a vertical position and that it is rotatably driven in any suitable or conventional manner. The particular spindle 12 here shown has a conventional drawbar 28 which extends through a central hole or passage 30 in the spindle and is reciprocably actuated by a power cylinder or the like (not shown).

A chuck body 32 mounted on the backing plate 10 has a radially extending base flange 34 which fits in a central recess 36 provided in the front face 26 of the plate, and an annular series of screws 38 extending through clearance holes 40 provided in the flange 34 and into threaded holes 42 in the plate hold the body attached solidly to the plate for rotation with the latter and with the spindle 12. In the particular form of the invention here shown, the head portions 44 of the screws 38 are partially recessed into countersinks 46 provided at the outer ends of the clearance holes 40.

In order to assure precise concentricity of the chuck body 32 with the rotational axis of the spindle 12, the recess 36 is made slightly larger in diameter than the flange 34 and the clearance holes 40 are made substantially larger in diameter than the screws 38 so that the base flange 34 is radially shiftable within limits relative to the backing plate 10. An annular series of setscrews 48 disposed in radial holes 50 provided at spaced intervals around the periphery of the backing plate 10 are in radial alignment with the recess 36 and bear on the periphery of the flange 34. Manifestly, the setscrews 48 collectively hold the flange 34 of the chuck body 32 normally fixed against lateral movement in the recess 36, but they can be selectively advanced and retracted to shift the flange 34 in the recess 36 as required to achieve precise concentricity of the chuck body 32 with the rotational axis of the spindle 12.

A collet 52 is here shown mounted on the chuck body 32 with the tapered inner end 54 thereof seating on a tapered or conical expanding surface 56 provided on the chuck body 32 at a point spaced substantially forwardly of the base flange 34. The usual expander 58 at the outer end of the collet 52 has a tapered peripheral surface 60 which engages and supports the tapered outer end 62 of the collet. The shank portion 64 of the expander 58 extends through a central bore 66 in the chuck body 32, and a coupling 68 screwed on the threaded end 70 of the shank and on the threaded end 72 of the drawbar 30 connects the drawbar and the expander 58 for mutual reciprocable motion.

When the drawbar 28 is retracted, the expander 58 is moved to the left, as viewed in FIG. 1, to squeeze the collet 52 between the tapered expanding surfaces 56 and 60. This action, of course, expands the collet 52 radially into tight clamping engagement with a workpiece 74 mounted thereon. Conversely, advancement of the drawbar 28 moves the expander 58 to the right, as viewed in FIG. 1, separating the tapered surfaces 56 and 60 and releasing the collet 52 so that the latter is free to contract and disengage or at least unclamp the workpiece 74. A radial shoulder 76 provided on the expander 58 behind the tapered expanding surface 60 seats on the end 78 of the chuck body 32 to limit retraction of the drawbar 28 and consequent overstressing of the collet 52. Similarly, engagement of the end 80 of the coupling 68 with a radial shoulder 82 provided internally of the chuck body 32 limits advancement of the drawbar 28 and consequently the distance the two expanding surfaces 56 and 60 can separate. It is desirable that the expanding surfaces 56 and 60 never separate sufficiently so that they move completely out of engagement with the collet 52 as this would permit dirt and other foreign matter to lodge between the collet and the expanding surfaces if the chuck body 32 and of the expander 58 and adversely affect the operation of the chuck. In this connection, a rubber sleeve 84 surrounds the end of the chuck body and the expander 58 behind the tapered peripheral surface 60 thereof to prevent dirt or other foreign matter from passing through the slots of the collet 52 and lodging between the shoulder 76 and the end 78 of the chuck body and thus interfering with retraction of the drawbar 28 and expansion of the collet 52 into clamping engagement with the work 74.

In many kinds of machining and other operations, it is necessary that the workpiece be positioned accurately axially by the chuck, and it is conventional practice, therefor, to provide chucks generally, including chucks of the type here under consideration, with end stops, which are usually annular in form, against which the inner end of the workpiece butts. However, the shape and kind of workpiece may prevent it form seating solidly on the end stop entirely around its circumference if the end stop is fixed or immovably mounted on the chuck. For example, the inner end of the workpiece may not be a finished surface and it, therefore, may not be exactly square with the axis of the workpiece. This is particularly true if the workpiece is a casting for example. If the end stop is fixed, pullback action exerted by the chuck tends to pull the work back against the stop with such force that it sometimes flexes or bends the chuck arbor and the workpiece out of line. If this happens, it will of course, be impossible to machine or otherwise finish the workpiece precisely to a close tolerance dimension in relation to the distorted locating bore. Attempts have been made to overcome this problem by mounting the end stop so that it is free to tilt and adjust to the end of the workpiece. However, this arrangement usually involves lateral movement directly between the workpiece and the stop which results in binding and a buildup of strain in the arbor as the chuck begins to pull the workpiece back solidly against the end stop under clamping action.

The difficulties referred to above are overcome by the floating end stop mounting of this invention which comprises superimposed front and rear annular, washerlike stop elements 86 and 88 which surround the chuck body 32 at substantially the juncture thereof with the base flange 34. The rear stop element 88 is considerably smaller in diameter than the front stop element 86, as perhaps best shown in FIG. 3, and it is substantially entirely accommodated within a tapered annular recess 90 provided at the rear of the front element. The back surface 92 of the rear stop element 88 seats on and solidly engages a radial shoulder 94 at the inner end of the chuck body 32. As shown, substantial clearance is provided between the inner annular surface 96 of the rear stop element 88 and the periphery 98 of the body 32 so that the element 88 is free to shift laterally within limits relative to the chuck body. The front surface 100 of the element 88 is inclined or beveled forwardly and inwardly at a relatively steep angle of approximately 45° and it is also transversely spherically curved so that it has essentially a line contact with the beveled inner surface 102 and the front stop element 86. In practice, the bevel surface 102 also is inclined at a relatively steep angle preferably in the order of 45°. If desired, the bevel surface 102 can be spherically curved tranversely to match the confronting and seating surface 100 of the rear stop element 88. However, a flat, beveled, conical surface is easier and less expensive to form and for that reason it is the preferred shape. The inner annular surface of the front stop element 86 ahead of the bevel surface 102 also is substantially larger in diameter than the chuck body 32 so that substantial lateral clearance is provided between these two members, and a groove 104 is provided therein to receive and retain a conventional O-ring 106 which surrounds and snugly fits the body 32. The front radial surface 108 of the stop element 86 is essentially flat to provide a seat for the inner end of the workpiece 74, and it preferably is formed with a plurality of circumferential spaced beveled grooves 110 which relieve the seating surface and permit chips or dirt to escape from between the stop and the workpiece.

From the foregoing, it will be readily apparent that the two washerlike elements 86 and 88 together with the O-ring 106 provide a free floating stop for the workpiece 74. The rear stop element 88 seats flatly on the shoulder 94 and the front stop element 86 seats solidly against the element 88. The O-ring 106 holds the front element concentrically to the chuck body 32 and it also seals the annular space between the element 86 and the chuck body so that chips and other foreign matter coming off the work or other wise having access to the stop cannot wedge between the stop and the chuck body or between the seating surfaces of the stop elements 86 and 88 to interfere or adversely affect the operation and function of the stop.

When the workpiece 74 is chucked, the clamping action tends to pull the workpiece rearwardly against the seating face 108 of the front stop element 86. In many cases, the workpiece is pulled back with considerable force which, as suggested, is sometimes sufficient to flex or bend the chuck body and to warp the workpiece out of true alignment with the rotational axis of the chuck. With the stop construction and arrangement here shown, however, the front stop element 86 is free to rock universally on the tapered spherical front surface 100 of the rear stop element 88 as required to keep the seating surface 108 thereof flatly against the inner end of the workpiece 74, thus assuring a flat supporting seat for the inner end of the workpiece entirely around the circumference of the latter. Moreover, there is no tendency or need for the front stop element 86 to shift laterally relative to the workpiece. Rather, as the front stop element 86 tilts to accommodate the workpiece 74, the rear stop element 88 shifts laterally on the shoulder 94 to maintain a solid, circumferentially continuous support for the front stop element 86. Thus, the front stop element 86 is confined to a straight up and down movement. All of the lateral shifting movement required in maintaining a flat support for the workpiece is done by the rear stop element 88. By eliminating any tendency for the front stop element 86 to move laterally or radially, there is no tendency for it to bind under the restraining influence of the O-ring mounting 106 and there is no tendency for the front stop element to overstress the O-ring at one side of the chuck body 32 or to move so as to destroy the seal normally maintained by the O-ring. Further, the ease and freedom with which the front stop element 86 rocks on the rear element 88 substantially completely relieves all of the forces which otherwise tend to accumulate and which might otherwise result in flexure and distortion of the work chucking parts.

While the O-ring type of seal hereinabove described is the preferred form, it is contemplated that any suitable type of flexible mounting can be used for sealing the front stop element 86 and for holding the latter concentric on and to the chuck body 32. For example, in FIG. 5, the O-ring is replaced by a flat, flexible annular sealing element 111. In this particular form of the invention, the inner marginal edge portion of the sealing element 111 is received within and confined by an annular groove 112 in the chuck body 32 and the outer marginal edge portion is received within and confined by a groove 114 provided in the stop element 86. Preferably the groove 114 is offset slightly forwardly with respect to the groove 112 so that the sealing element 111 is flexed forwardly as shown in the drawing, whereby the sealing element tends to pull the stop element 86 rearwardly against the rear stop element 88 and to maintain a firm seating engagement therebetween. Otherwise, the action and function of the sealing element shown in FIG. 5 is the same as the one shown in FIGS. 1–4.

I claim:

1. In a chuck of the type having a body provided with an axially extending, centrally disposed stationary chuck part and work-holding means adapted to grip a workpiece with the axis of the work coincident with the axis of the work-holding means and to pull the same back axially in the direction of the body,
means
forming a radially extending annular surface on said chuck part behind said work-holding means and concentric to the latter;
separate front and rear annular members
interposed between said annular surface and said work-holding means independently movable relative to each other and also relative to said annular surface and to said work-holding means, said annular members having opposed, mutually engaged, beveled seating surfaces and the beveled seating surface of at least one of said members being spherically curved; and
resilient means
interposed and compressed between and mutually cooperative with the stationary part of said chuck body and said front annular member holding the latter normally centered on said chuck and said rear member against said annular surface while permitting universal rocking movement of said front member on the seating surface of said rear member,
said front member forming an end stop for a work piece gripped by said work-holding means and adapted to rock or tilt as required to flatly engage said workpiece and further to move essentially axially under clamping pressure as said workpiece is pulled back thereagainst by said work-holding means,
said rear member having a flat rear surface seating on said annular surface and being laterally shiftable thereon as required to accommodate rocking and axial movement of said front end stop member.

2. The combination as set forth in claim 1 wherein said spherically curved seating surface is on said rear annular member.

3. The combination as set forth in claim 1 wherein said resilient means is annular in form and is interposed radially between said chuck part and said front annular member.

4. The combination as set forth in claim 1 wherein said resilient means is in the form of an O-ring disposed between and radially compressed by said chuck part and said front annular member.

5. The combination as set forth in claim 1 wherein the beveled seating surface of said front and rear annular members are at a relatively steep angle of approximately 45°.

6. The combination as set forth in claim 1 wherein the seating surface of said front annular member extends radially inwardly substantially beyond the seating surface of said rear annular member.

7. In a chuck of the type having
work-holding means
adapted to clamp a workpiece and to pull the same axially back in the chuck,
means forming a radially extending annular shoulder
on said chuck behind and concentric to said work-holding means,
an adjustable member
on and shiftable laterally relative to said shoulder and having a beveled annular seating surface which is convexly curved transversely thereof; and
means forming an end stop for work in the chuck
adapted to seat the inner end of the work as the latter is clamped and pulled back in the chuck by said work-holding means, said end stop being supported for universal rocking or tilting movement on the annular spherically curved seating surface of said adjustable member, said end-stop-forming means rockably movable on said seating surface as required to flatly engage said workpiece and adapted to move primarily axially under clamping pressure, and said adjustable member being shiftable laterally on said shoulder as required to accommodate rocking and axial movement of said end-stop-forming means.

8. The combination as set forth in claim 7 including an annular part on said chuck spaced radially from said end-stop-forming means, and
an annular resilient element interposed and compressed between said part and said end-stop-forming means.

9. The combination as set forth in claim 8 wherein said end-stop-forming means is in the form of a ring and wherein said ring has an annular groove which receives and partially contains said resilient member, whereby the latter holds said ring against said adjustable member and seals the space between said ring and said chuck part and also protects the seating surface of said adjustable member from chips, dirt and the like.

10. The combination as set forth in claim 7,
wherein said end-stop-forming means has an annular beveled recess which defines a surface that engages and is supported by said adjustable member,
and wherein said adjustable member is substantially entirely received within the annular beveled groove of said end-stop-forming means, whereby said end-stop-forming means substantially entirely surrounds, shields and protects said adjustable member and the radial annular shoulder of the chuck on which said adjustable member is supported from chips, dust and the like coming off the work in use.

11. The combination as set forth in claim 8,
wherein said annular resilient element is disposed essentially close to the surface of said end-stop-forming means against which the inner end of the work in the chuck seats in use.